(12) United States Patent
Hou et al.

(10) Patent No.: US 8,218,465 B1
(45) Date of Patent: Jul. 10, 2012

(54) SELECTIVE DEMODULATION OF DOWNLINK TRAFFIC IN WIRELESS COMMUNICATION SYSTEMS

(75) Inventors: Jason Hou, Carlsbad, CA (US); Sean Cai, San Diego, CA (US); Mary Chion, Belle Mead, NJ (US)

(73) Assignee: ZTE (USA) Inc., Morristown, NJ (US)

( * ) Notice: Subject to any disclaimer, the term of this patent is extended or adjusted under 35 U.S.C. 154(b) by 217 days.

(21) Appl. No.: 11/329,917

(22) Filed: Jan. 10, 2006

Related U.S. Application Data

(60) Provisional application No. 60/643,781, filed on Jan. 11, 2005.

(51) Int. Cl.
*G08C 17/00* (2006.01)
(52) U.S. Cl. ........ 370/311; 370/328; 370/348; 370/459; 370/395.4
(58) Field of Classification Search .................. 370/342, 370/328, 311, 321, 329–330, 336–337, 346–348, 370/395.4, 442, 458–462, 338; 455/574, 455/343.1–343.5, 450, 452.1
See application file for complete search history.

(56) References Cited

U.S. PATENT DOCUMENTS

| | | | |
|---|---|---|---|
| 5,241,542 A * | 8/1993 | Natarajan et al. ............. | 370/311 |
| 2004/0190467 A1 * | 9/2004 | Liu et al. ....................... | 370/311 |
| 2005/0030931 A1 * | 2/2005 | Sung et al. .................... | 370/342 |
| 2005/0159163 A1 * | 7/2005 | Chang et al. .................. | 455/450 |
| 2006/0029011 A1 * | 2/2006 | Etemad et al. ................ | 370/311 |
| 2007/0218889 A1 * | 9/2007 | Zhang et al. ............... | 455/422.1 |
| 2009/0067374 A1 * | 3/2009 | Yoon et al. .................... | 370/329 |

OTHER PUBLICATIONS

IEEE 802.16-2004, "IEEE Standard for Local and Metropolitan Area Networks, Part 16: Air Interface for Fixed Broadband Wireless Access Systems," Oct. 1, 2004, 895 pages.
IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1," Feb. 18, 2006, 864 pages.
IEEE P802.16-REVd/D5, "Part 16: Air Interface for Fixed Broadband Wireless Access Systems", pp. 1-915 (May 13, 2004).
IEEE P802.16-REVe/D5a-2004, "Amendment for Physical and Medium Access Control Layers for Combined Fixed and Mobile Operation in Licensed Bands" pp. 1-474 (Dec. 2004).

* cited by examiner

*Primary Examiner* — Marcos Torres
(74) *Attorney, Agent, or Firm* — Perkins Coie LLP

(57) ABSTRACT

Techniques of selective demodulation of downlink frames using a subscriber description segment or activity descriptor to identify one or more subscriber stations to which at least a portion of data placed in the downlink frame is addressed in wireless communication systems such as frame-based point-to-multipoint wireless communication systems. The described techniques can be used to reduce power consumption at each subscriber station and to elongate the battery time of mobile devices, especially in the bursty Internet data transmission. The subscriber station can use information in the subscriber description segment or activity descriptor to decide whether to turn off receiver power for the remainder of a received downlink frame.

16 Claims, 5 Drawing Sheets

SELECTIVE DEMODULATION OF DOWNLINK TRAFFIC IN WIRELESS COMMUNICATION SYSTEMS

CROSS REFERENCE TO RELATED APPLICATIONS

This application claims the benefit of provisional U.S. application Ser. No. 60/643,781, entitled "Selective demodulation of downlink traffic in wireless communication systems" and filed Jan. 11, 2005, which is incorporated herein by reference in its entirety as part of the specification of this application.

BACKGROUND

This application relates to wireless communication systems and techniques.

Various wireless communication systems use a network of radio transceivers as base stations to wirelessly communicate with wireless communication devices via electromagnetic waves. The geographic area covered by the electromagnetic waves from the base stations is divided into cells and each cell is associated with one corresponding base station. A base station sends out a downlink signal to carry data or messages to two or more different wireless communication devices or subscriber stations within the cell of the base station. Each wireless communication device decodes the entire downlink signal to recover the data intended for that particular wireless communication device while discarding other data intended for other wireless communication devices.

SUMMARY

In various wireless systems such as frame-based point-to-multipoint systems, each subscriber station decodes or demodulates the entire received downlink traffic even when one or more frames in the downlink traffic do not include any data addressed to a particular subscriber station. This mode of operation at each subscriber station is wasteful of power at the subscriber station, especially when the subscriber station is a mobile wireless device that operates on battery power. In many frame-based point-to-multipoint systems, data addressed to a particular subscriber station or a particular group of subscriber stations often comes as data bursts and appears on some but not all downlink frames. Hence, only a small percentage of the downlink traffic is addressed to a specific subscriber station in most cases. As an example, such situations often exist for the Internet data transmission where the traffic pattern is bursty and irregular. As a result, the majority of data transmission to a specific user at a subscriber station in frame-based point-to-multiple point systems happens in a small fraction of frames in the downlink traffic.

Therefore, in a frame-based point-to-multipoint wireless communication system, the power efficiency of battery-powered wireless subscriber devices can be enhanced by adding a subscriber description segment or an activity descriptor in a beginning portion of each downlink frame to allow for a subscriber device to detect at the beginning of a received frame whether the received frame contains data addressed to the receiving subscriber device. If the frame does not have any data for the receiving subscriber device, the receiving subscriber device can turn off receiver power for the remainder of the frame to save the power. As a result, the subscriber description segment or an activity descriptor in the beginning portion of each downlink frame allows for selective demodulation of the downlink frames at each subscriber station.

Various examples for implementing the above selective demodulation of the downlink frames are described. In one example, a method is described to provide a frame structure in combination with a frame-based point-to-multipoint wireless communication system that includes activity descriptors in a beginning portion of each downlink frame where a number of users in multi-user frames is determined and a list or abridged list containing identities of users, called a activity descriptor, is constructed. The descriptor is placed as part of a beginning portion of the frame alongside with, if appropriate, a training sequence or symbol pertaining to the downlink frame. The frame-based communication system for implementing the method may include a periodic framing structure which may be, e.g., in Time Division Duplexing (TDD) or Frequency Division Duplexing (FDD). The frame-based system may also be modulated in various formats, e.g., a single carrier format, a multicarrier format, and a spread spectrum format. In one implementation of the method, a mechanism may be provided for a subscriber station to quickly determine whether the immediate or the following frames contain activities, either in uplink or downlink, and to decide whether transceiver circuits can be turned off to reduce power consumption. The activity descriptor may include, e.g., a compressed list of partial subscriber identities to reduce the size of the descriptor. The activity descriptor may also be configured to include a data structure to aid in distinguishing frame usage of the frame in a multi-user format. In addition, the activity descriptor may include a universal indicator for specifying broadcast traffic whereby all subscriber units are required to demodulate the immediate downlink frame.

In another example, a method for wireless communication is described to include: providing a description segment at a beginning portion of each downlink frame from a base station to identify one or more subscriber stations to which at least a portion of data placed in the downlink frame is addressed; causing a subscriber station in communication with the base station to first decode the description segment of each received downlink frame and to determine whether the receiving subscriber station is identified by the description segment as one of the subscriber stations to which at least one portion of the data placed in the downlink frame is addressed; when the receiving subscriber station is not identified in the description segment of the received downlink frame, causing the receiving subscriber station to turn off a receiver in the receiving subscriber station for a remainder of the received downlink frame without further receiving and decoding the remainder of the received downlink frame; and when the receiving subscriber station is identified in the description segment of the received downlink frame, causing the receiving subscriber station to continue receiving and decoding the remaining part of the received downlink frame to recover data in the received downlink frame that is addressed to the receiving subscriber station.

In another example, this application describes a method for wireless communication in a system where a base station produces a downlink frame that includes a description segment at a beginning portion of the downlink frame to identify one or more subscriber stations to which at least a portion of data placed in the downlink frame is addressed. In this method, a subscriber station in communication with the base station first decodes the description segment of each received downlink frame and determines whether the receiving subscriber station is identified by the description segment as one of the subscriber stations to which data placed in the downlink frame is addressed.

In yet another example, this application describes a method for wireless communication to cause a base station to send out a downlink signal in which each downlink frame includes a description segment at a beginning portion of the downlink frame to identify one or more selected subscriber stations to which at least one portion of data placed in the downlink frame is addressed.

These and other examples, implementations, and their operations are described in greater detail in the attached drawings, the detailed description and the claims.

DETAILED DESCRIPTION

Figure 1:
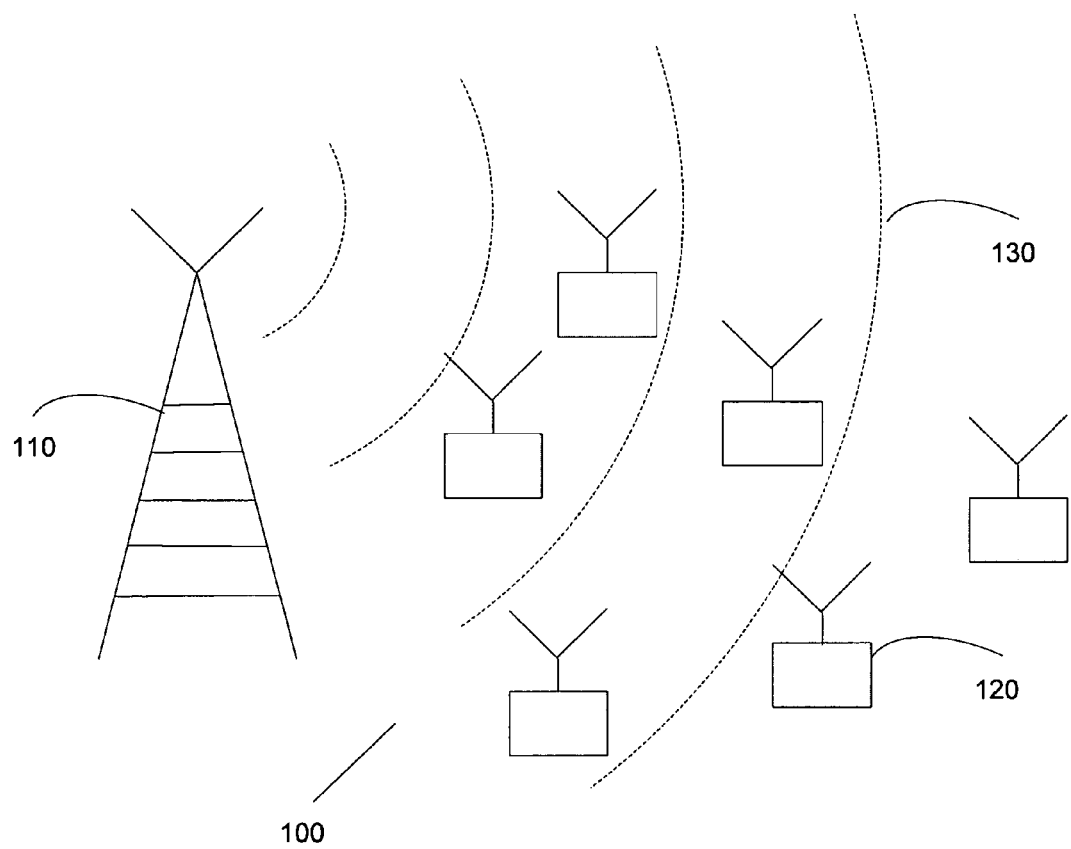
FIG. 1 shows an example of a wireless communication system that can be used to implement the selective demodulation described in this application.

FIG. 1 shows one example of a wireless communication system 100 that can be used to implement the selective demodulation of downlink frames described here. The system 100 includes spatially distributed base stations 110 that provide radio coverage, wireless subscriber stations 120 that wirelessly communicate with their respective base stations 110, and base station controllers each coupled to and to control a designated group of base stations 110. The system 100 may be a frame-based point-to-multiple point wireless communication system. Each subscriber station 120 may be a stationary or mobile wireless communication device. Examples of a stationary wireless device may include desktop computers and computer servers. Examples of a mobile wireless device may include mobile wireless phones, Personal Digital Assistants (PDAs), and mobile computers. A subscriber station may be any communication device capable of wirelessly communicating with base stations. The point-to-multipoint wireless communication system 100 allows multiple subscriber stations 120 communicate with a base station 110 at the same time via wireless channel 130.

The system 100 is designed to add an activity descriptor or a subscriber description segment in the beginning portion of the downlink frame so that subscriber stations 120 can turn off receiver power upon determining that there is no relevant information addressed to the specific subscriber station based on the activity descriptor.

Figure 2:
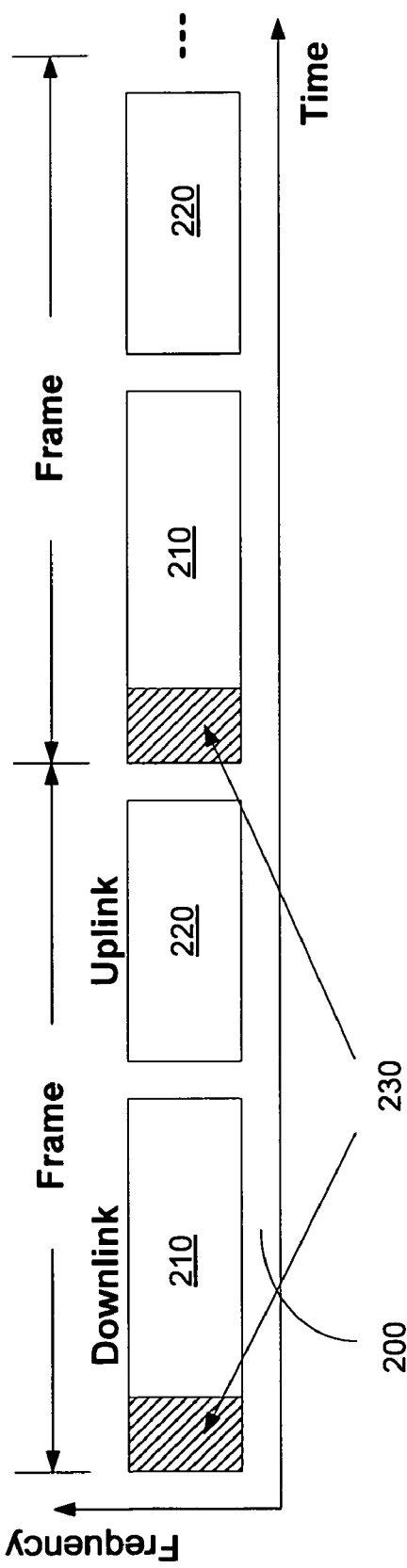
FIGS. 2, 3, 4 and 5 illustrate examples of downlink frames having subscriber segments or activator descriptors to identify one or more selected subscriber stations to which at least one portion of data placed in the downlink frame is addressed.

FIG. 2 shows one example of the activity descriptor method in a point-to-multipoint Time Division Duplex (TDD) transmission systems. This TDD system shares a common frequency carrier 200 between the uplink 220 and the downlink 210. Each frame includes both the downlink subframe 210 and the uplink subframe 220 for communication traffic. An activity descriptor 230 is added to the beginning portion of the downlink traffic 210. In TDD system, the resource is switched between the uplink traffic and downlink traffic in time.

Figure 3:
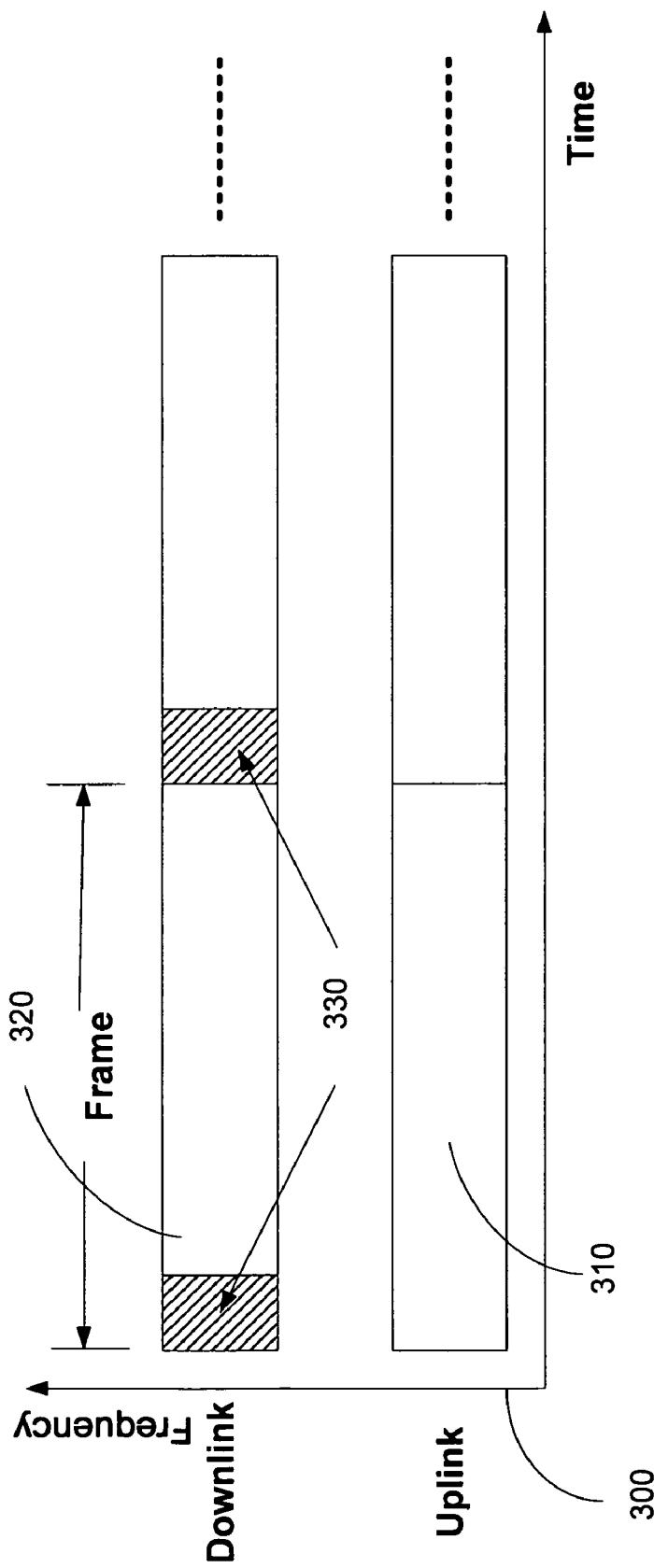

FIG. 3 shows the activity descriptor method in a point-to-multipoint Frequency Division Duplex (FDD) transmission 300 where separate frequency carriers are used for the uplink 310 and downlink 320. User subscriber stations tune between different frequency carriers for the uplink 310 and downlink 320 to transmit and receive, respectively. As illustrated, the uplink and downlink are located in different frequencies. The activity descriptor 330 is added to the beginning portion of each downlink frame 320 in the downlink frequency band.

The activity descriptors 230 and 330 are designed and used to reduce power consumption in the frame-based point-to-multiple point wireless communication system 100 which may be configured according to suitable wireless communication standards, such as IEEE 802.16 SCa, OFDM (orthogonal frequency division multiplexing) and OFDMA (orthogonal frequency division multiple access). The multi-user information is carried in a data frame that is addressed to multiple users or subscriber stations. The usage of the frame is contained in a map to indicate methods and locations of user-specific data. To elongate battery operation and to save power, the downlink frame structure is designed to include, aside from the training symbols, a list or an abridged list of users appears as part of the beginning portion of the immediate downlink frame. Hence, a subscriber station can first decode this list and quickly determine whether the receiving frame contains information addressed to itself and to determine whether the receiver circuitry can be turned off to conserve precious battery power.

The list or abridged list of users is coined "activity descriptor" as represented by data segments 230 and 330 in FIG. 2 and FIG. 3, respectively. The activity descriptor 230 or 330 serves as a quick indicator for subscribers to determine whether the current frame, uplink 220 or downlink 210, includes activities belonging to the receiving subscriber station. When the quick reception shows no relevant activities, the receiving subscriber station can turn off receiver/transmitter during the rest of the frame so as to conserve battery power.

Figure 4:
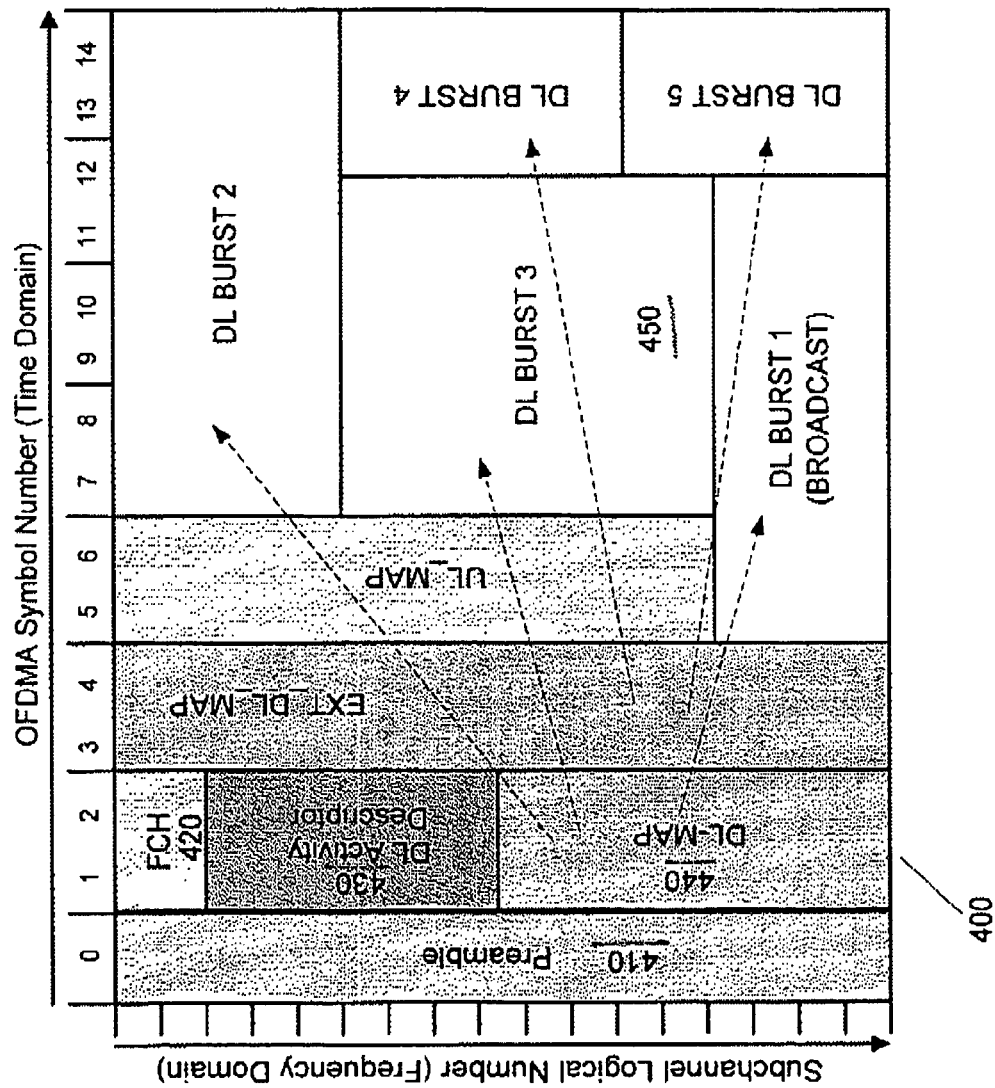
Figure 5:
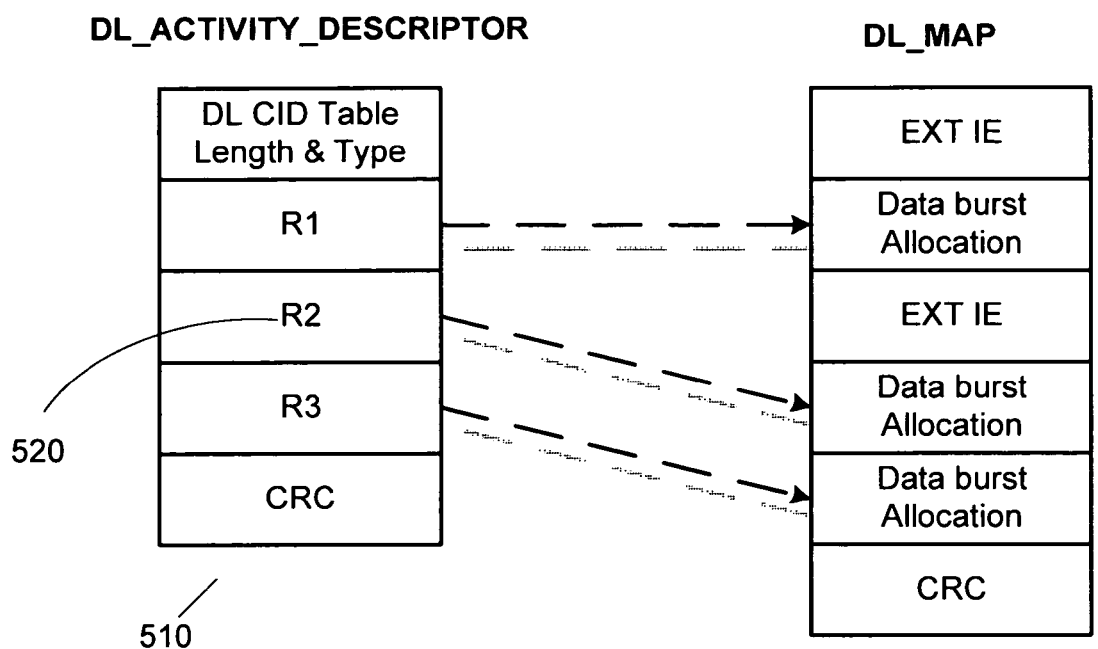

As an example, the selective demodulation based on the activity descriptor can be applied to OFDM and OFDMA deployments in frame based point-to-multi point wireless systems. FIGS. 4 and 5 illustrate the implementation details in this example.

Referring to FIG. 4, an OFDMA downlink (DL) frame structure 400 may include, sequentially in time, a preamble 410 as the beginning segment of the frame; a frame control header (FCH) 420, a downlink activity descriptor 430 and a downlink map 440 that follow the FCH 420; an optional extended downlink map; an uplink map; and downlink data bursts 450. In this example, the downlink activity descriptor 430 is a part of the beginning portion of the downlink frame. In operation, each receiving subscriber station first decodes the preamble 410 and then starts to decode the FCH 420 to determine the type the received downlink frame 400. Immediately after the FCH 420, the receiving subscriber station decodes the DL Activity Descriptor 430 to see whether the receiving subscriber station is included in the Descriptor record entry.

FIG. 5 shows an example of the downlink activity descriptor 510 which includes subscriber identifiers 520 (R1, R2, R3, etc.) that are linked to data burst allocations for identified subscriber stations. Once a subscriber station (SS) identification 520, such as a Connection Identifier (CID) and MAC ID, is indicated in the DL Activity Descriptor, the identified subscriber station which receives the downlink frame, after completion of decoding the downlink activity descriptor 430, continues to decode the following DL-MAP 440. From the record entry order, the subscriber station can identify which burst location 450 indicated by DL-MAP 440 should also be decoded for data information and proceeds to decode the proper data burst segment. If the subscriber identifications included in the DL Activity Descriptor entries 520 do not include the receiving subscriber station, the receiving subscriber station is controlled to stop processing the rest of the DL frame. For example, the receiving subscriber station may stop processing the DL-MAC.

In implementations, the above described techniques and their variations may be implemented as computer software instructions or firmware instructions. Such instructions may be stored in an article with one or more machine-readable storage media or stored in one or more machine-readable storage devices connected to one or more computers. In operation, the instructions are executed by, e.g., one or more computer processors, to cause the machine to perform the described functions and operations. For example, the techniques for generating the activity descriptor in each downlink frame for the downlink traffic from each base station may be implemented as computer instructions stored in the base stations or a control module that controls base stations. The techniques for controlling each subscriber station for the selective demodulation of downlink frames may be implemented as computer instructions stored in the subscriber stations.

Only a few implementations and examples are described. However other variations, modifications and enhancements are possible.

What is claimed is:

1. A method for wireless communication, comprising:
   transmitting, from a base station, a frame that comprises a downlink subframe and an uplink subframe, wherein the downlink subframe comprises a single description segment, a downlink map, and one or more data burst segments, wherein the single description segment is separate from the downlink map and appears in a beginning portion of the downlink subframe and in a subchannel location before the downlink map, the single description segment including one or more unique subscriber identifiers to identify one or more corresponding subscriber stations to which at least a portion of data placed in the downlink subframe is addressed, wherein the downlink map comprises information indicative of one or more data burst segment locations within the downlink subframe;
   causing a subscriber station in communication with the base station to receive and decode the single description segment in the downlink subframe before decoding the downlink map and to determine whether the receiving subscriber station is identified by the single description segment as one of the subscriber stations to which at least one portion of the data placed in the downlink subframe is addressed;
   when the receiving subscriber station is not identified in the single description segment, causing the receiving subscriber station to turn off a receiver in the receiving subscriber station for a remainder of the frame without further receiving and decoding the remainder of the frame; and
   when the receiving subscriber station is identified in the single description segment, causing the receiving subscriber station to continue receiving and decoding a remaining part of the frame to recover data in the downlink subframe that is addressed to the receiving subscriber station.

2. A method as in claim 1, wherein the frame comprises a time division duplexing frame which includes the downlink subframe and the uplink subframe, and wherein the single description segment is placed in time prior to the uplink subframe.

3. A method as in claim 1, wherein the frame comprises a frequency division duplexing frame.

4. A method as in claim 1, wherein a subscriber identifier of the one or more unique subscriber identifiers is based on a connection identifier and a media access control identifier.

5. A method as in claim 1, wherein the base station and each subscriber station communicate with each other under an orthogonal frequency division multiplexing (OFDM) or orthogonal frequency division multiple access (OFDMA) standard.

6. A method as in claim 5, further comprising:
   causing a subscriber station to first sequentially decode a preamble and a frame control header in the downlink subframe; and
   after decoding the frame control header, causing the subscriber station to decode the single description segment before decoding the downlink map.

7. A method as in claim 6, further comprising:
   when the subscriber station is identified in the single description segment causing the subscriber station to decode the downlink map (DL-MAP) in the downlink subframe.

8. A method for wireless communication in a system where a base station produces a downlink frame that includes a description segment as part of a beginning portion of the downlink frame to identify one or more subscriber stations to which at least a portion of data placed in the downlink frame is addressed, the method comprising:
   receiving at a subscriber station a downlink frame, the received downlink frame comprising a description segment, a downlink map, and data burst segments, wherein the description segment is separate from the downlink map and is arranged in a subchannel position prior to the downlink map in the downlink frame, wherein the downlink map comprises information indicative of data burst segment locations within the received downlink frame, and wherein the description segment of the received downlink frame includes subscriber station identification indices that uniquely identify corresponding subscriber stations and are respectively linked to entries within the downlink map;
   causing the subscriber station in communication with the base station to first decode the description segment of the received downlink frame before decoding the downlink map and to determine whether the receiving subscriber station is identified by the description segment of the received downlink frame as one of the subscriber stations to which data placed in the received downlink frame is addressed; and
   causing the subscriber station to selectively decode the downlink map based on information in the description segment of the received downlink frame.

9. A method as in claim 8, further comprising:
   when the receiving subscriber station is identified in the description segment of the received downlink frame, causing the receiving subscriber station to continue receiving and decoding the remaining part of the received downlink frame to recover data in the received downlink frame that is addressed to the receiving subscriber station.

10. A method as in claim 8, further comprising:
    when the receiving subscriber station is not identified in the description segment of the received downlink frame, causing the receiving subscriber station to turn off a receiver in the receiving subscriber station for a remainder of the received downlink frame without further receiving and decoding the remainder of the received downlink frame, wherein the remainder includes the downlink map of the received downlink frame.

11. A method as in claim 10, further comprising:
    when the receiving subscriber station is identified in the description segment of the received downlink frame, causing the receiving subscriber station to continue receiving and decoding the remaining part of the received downlink frame to recover data in the received downlink frame that is addressed to the receiving subscriber station.

12. A wireless communication system, comprising:
- a base station to wirelessly communicate with wireless subscriber stations;
- a transmitter to transmit, from the base station, a frame that comprises a downlink subframe and an uplink subframe, wherein the downlink subframe comprises a single description segment, a downlink map, and one or more data burst segments, wherein the single description segment is separate from the downlink map and appears in a beginning portion of the downlink subframe, in a subchannel position before the downlink map, the single description segment including one or more unique subscriber identifiers to identify one or more corresponding subscriber stations to which at least a portion of data placed in the downlink subframe is addressed, wherein the downlink map comprises information indicative of one or more data burst segment locations within the downlink subframe;
- a mechanism to control a subscriber station receiving the downlink subframe to first decode the single description segment and to determine whether the subscriber station is identified by the single description segment as one of the subscriber stations to which at least one portion of the data placed in the downlink subframe is addressed;
- a mechanism to control the subscriber station to turn off a receiver in the subscriber station for a remainder of the frame without further receiving and decoding the remainder of the frame, when the subscriber station is not identified in the single description segment of the downlink subframe; and
- a mechanism to control the subscriber station to continue receiving and decoding a remaining part of the frame to recover data in the received downlink subframe that is addressed to the receiving subscriber station, when the subscriber station is identified in the single description segment of the downlink subframe.

13. A system as in claim 12, wherein the frame comprises a time division duplexing frame which includes the downlink subframe and the uplink subframe, and wherein the single description segment is placed in time prior to the uplink subframe.

14. A system as in claim 12, wherein the frame comprises a frequency division duplexing frame.

15. A system as in claim 12, wherein the base station and each subscriber station communicate with each other under an orthogonal frequency division multiplexing (OFDM) or orthogonal frequency division multiple access (OFDMA) standard.

16. A system as in claim 12, wherein a subscriber identifier of the one or more unique subscriber identifiers is based on a connection identifier and a media access control identifier.

\* \* \* \* \*